Sept. 16, 1969  E. W. DICKSON ET AL  3,467,593
ELECTROCHEMICAL DEBURRING UNDER PRESSURE
Filed June 16, 1966  2 Sheets-Sheet 1

Inventors
E. W. DICKSON
A. F. GROGAN
By
Holcombe, Wetherill & Brisebois
Attorneys Sept. 16, 1969  E. W. DICKSON ET AL  3,467,593
ELECTROCHEMICAL DEBURRING UNDER PRESSURE
Filed June 16, 1966  2 Sheets-Sheet 2

Inventors
E. W. DICKSON
A. F. GROGAN
By
Holcombe, Wetherill & Brisebois
Attorneys United States Patent Office 3,467,593
Patented Sept. 16, 1969

3,467,593
ELECTROCHEMICAL DEBURRING UNDER PRESSURE
Eric Winston Dickson and Anthony Frederick Grogan, Leamington Spa, England, assignors to Associated Engineering Limited, Leamington Spa, England, a British company
Filed June 16, 1966, Ser. No. 558,034
Claims priority, application Great Britain, June 17, 1965, 25,753/65
Int. Cl. B23p *1/02;* B01k *3/04*
U.S. Cl. 204—224                6 Claims

ABSTRACT OF THE DISCLOSURE

This invention relates to the deburring of metal workpieces by means of electrochemical machining employing a tool formed so that it has an exposed linear portion of metal in the surface of an enclosing body of insulating material, which exposed linear portion is aligned with and in juxtaposed relation to the linear edge of a metal workpiece from which burrs are to be removed. The tool and workpiece are disposed in an enclosure through which electrolyte flows through the working gap between the tool and the workpiece and so as to maintain a desired pressure within the enclosure.

---

Figure 1:
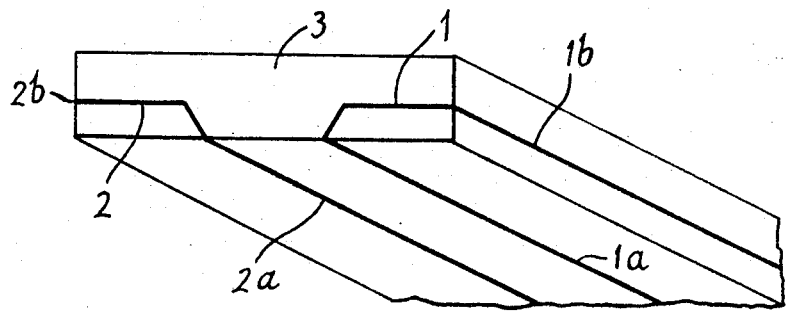

The present invention relates to electrochemical machining and more particularly to the application of an electrochemical machining process for the deburring of metal of metallic workpieces which are being produced in quantity, as by a mass production technique.

When machining operations are carried out on such workpieces, such as the drilling of holes or cutting of gear teeth, the region of metal at the edges of the machined area often has burrs formed on it which have to be removed by a subsequent operation. Up to the present time, the burrs have generally been removed as a hand operation, e.g. by filing them away, which is time consuming and costly.

The present invention provides a method and apparatus for deburring metal workpieces by means of electrochemical machining, that is to say by arranging a tool in close proximity to the part or parts of the metal workpiece to be deburred but so as to leave a gap between the tool and the workpiece, and connecting the tool and the workpiece in an electric circuit with the workpiece forming an anode and the tool a cathode so that a current can flow between the tool and the workpiece through an electrolyte which is present in the gap between them.

The deburring tool employed to remove the burrs from any particular workpiece usually has a portion which is shaped to conform to the region or regions to be deburred in order to concentrate the electrochemical machining action in the region or regions where the burrs exist. However, it has been found that in practice, the deburring operation may also sometimes act to remove metal from other parts of a workpiece which is undesirable, since it may cause the workpiece to depart from permitted tolerances in its dimensions.

It is an object of the present invention to provide a deburring tool in which the undesired removal of metal from a workpiece is substantially reduced or avoided.

According to the present invention, a deburring tool is so constructed that the only active portion of the tool which comes in close proximity to a workpiece to be deburred consists of one or more edges or strips of conducting material having a contour generally following the line or lines of the region or regions of the workpiece which are to be deburred.

One embodiment of deburring tool according to this invention may comprise one or more thin metal sheets or shims embedded in a body of insulating material with one or more edges of each sheet or shim exposed at the surface of the insulating material where a deburring action is required. The other edge or edges of each sheet or shim may be covered by the insulating material or cut back from its surface where no deburring action is required. The tool may be constructed as a sandwich with each sheet or shim disposed between pieces of insulating material or alternatively, the insulating material may be cast around one or more sheets or shims. In either case the assembly may be subsequently machined to provide the exposed edge or edges of the desired configuration.

In a further embodiment the tool may comprise one or more wires mounted on or partially embedded in a body of insulating material. The exposed portion of the wire or wires then constitute the edge or edges of the required configuration for effecting the deburring operation.

Figure 2:
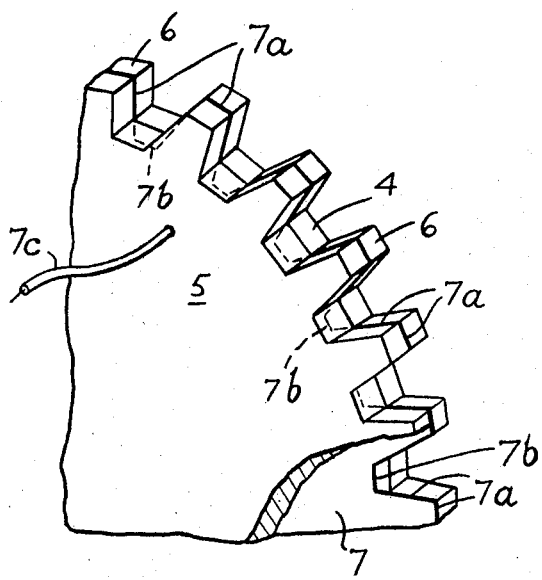
Figures 3, 4:
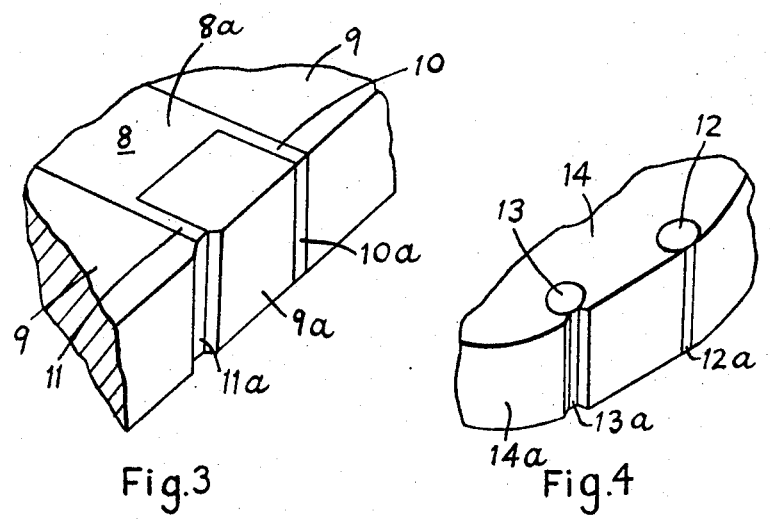
Figure 5:
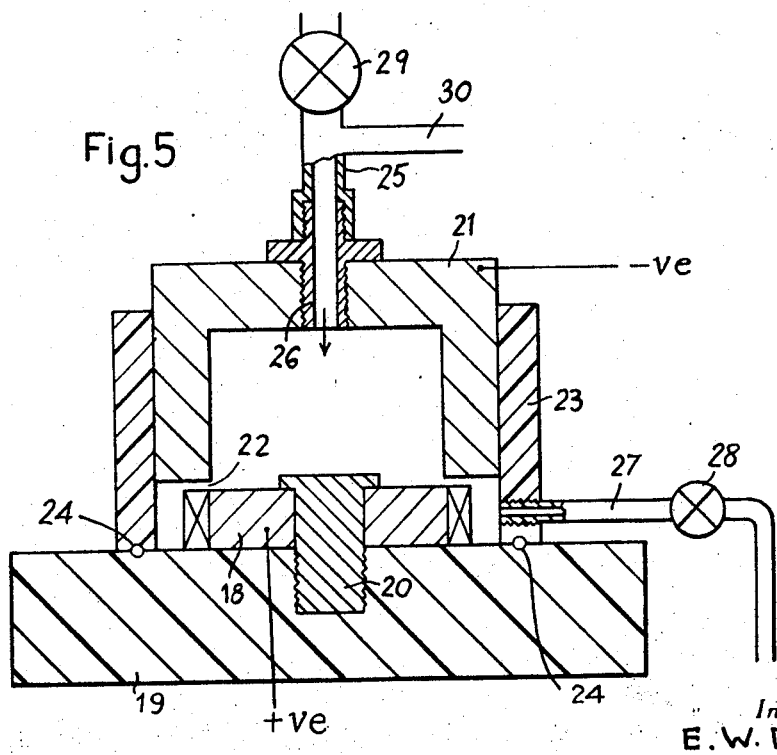

The invention will now be further described by way of example, with reference to the accompanying drawings in which:

FIGURE 1 is a perspective view of a portion of one embodiment of deburring tool, FIGURES 2, 3 and 4 are respectively perspective views of part of further embodiments of deburring tool, and FIGURE 5 is a simplified diagram of an embodiment of apparatus for carrying out a deburring operation.

Referring to FIGURE 1, the deburring tool comprises two thin sheets of metal 1 and 2, e.g. shims of 0.010 to 0.015 inch, embedded in a block 3 of an insulating material such as an epoxy resin. The edges 1a and 2a of the sheets are exposed at the working face of the tool to constitute the active deburring portions for removing burrs from two edges of a workpiece spaced in conformity with the edges 1a and 2a. The tool may be formed by casting the epoxy resin around the metal sheets 1 and 2 and then machining the surface 3 of the block to expose the edges 1a and 2a. Electrical connections are made to the sheets by any suitable means, such as by leads connected thereto and embedded in the block 3 or by exposing edges 1b and 2b of the sheets at the sides of the block 3.

Referring now to FIGURE 2, the deburring tool shown is intended for deburring gear teeth and comprises two similar shaped blocks of insulating material 4 and 5 having teeth 6 which interfit between the gear teeth to be deburred. Sandwiched between the two blocks 4 and 5 is a thin metal sheet 7 of generally similar size and shape to the blocks 4 and 5. The parts of the sandwich are secured together by any suitable means, such as rivets or by an adhesive. The edges of the sheet 7 are exposed at the surface of the tips and sides of the teeth 6, as shown at 7a, but are cut back below the insulating material between the teeth 6, as indicated at 7b. Thus deburring will take place on the sides of and between the gear teeth on a gearwheel to be deburred without removing metal from the tips or the gear teeth, which will lie opposite the regions 7b cut back from the surface of the insulating material. Electrical connection is made to the metal sheet 7 by any suitable means, e.g. by a lead 7c passing through one of the sheets of insulating material.

Instead of employing the sheet 7, a wire could be arranged around the teeth 6 having portions, corresponding to the portions 7b embedded in the insulating material.

The tool shown in FIGURE 2 intended for deburring an internally toothed gearwheel but obviously the same principle may be applied to a tool for deburring an externally toothed gearwheel.

FIGURE 3 shows a further embodiment of deburring tool comprising a metal block 8 embedded in insulating material 9, but having two arms 10, 11 whose ends 10a, 11a, are exposed at the side surface 9a of the insulating material. The ends of the arms may be flush with the surface 9a of the insulating material, as shown for the end 10a, or recessed from the surface of the insulating material, as shown for the end 11a. Electrical connection may be made to the exposed upper surface 8a of the metal block 8.

In the embodiment of FIGURE 4, a deburring tool is formed by embedding a plurality of rods 12, 13, in a body of insulating material. The structure is then machined to expose a portion of the rods at the side surface 14a of the insulating material. The exposed portion 12a of the rod 12 is shown as flush with the surface of the insulating material, whilst the exposed portion 13a of the rod 13 is shown as recessed from the surface of the insulating material. Electrical connections may be made to the exposed ends of the rods, or by means of leads embedded in the body 14 of the insulating material.

In both the embodiment of FIGURE 3 and that of FIGURE 4, it will be understood that the exposed portions of the metal on the side surface of the body of insulating material have a contour generally following the line or lines of the burred portion or portions of the workpiece to be deburred.

The recessing of the exposed portions of the conducting material from the surface of the insulating material helps to prevent short circuits between the tool and the workpiece during a deburring operation and also protects the exposed conducting material. Moreover, variation of the amount of this recession enables the current flow between the tool and the workpiece to be altered and thus the amount of metal removed in a given time from a particular part of workpiece to be controlled.

In use the tool is positioned with its contoured active conducting portion or portions opposite the region or regions to be deburred on the workpiece and an electrolyte is caused to flow through the gap between the tool and the workpiece whilst a D.C. potential is applied between the workpiece and the tool so that the workpiece forms an anode and the tool a cathode. The burrs will thus be removed by electrochemical machining action without any substantial removal of metal from other parts of the workpiece.

It will be understood that in carrying out the method according to the present invention the workpiece and the tool remain in fixed positions throughout the electrochemical deburring operation, whilst the minimum gap or spacing between them, which is of the order of a few thousandth of an inch, increases as the burrs are removed. Generally the burrs can be removed in a few tens of seconds, although the precise time depends on the size of the burrs and the exact conditions under which the electrochemical machining is carried out, as will be understood by those skilled in the art.

FIGURE 5 shows one embodiment of apparatus for carrying out the method of deburring according to the invention. A workpiece 18 is to be deburred is mounted on a base 19 with the surface to be deburred uppermost and secured in position by means of a bolt 20 extending through the centre of the workpiece. The deburring tool 21 is mounted above the workpiece by any suitable means, not shown, so as to leave a small working gap 22 between the tool and the workpiece through which electrolyte can flow. The workpiece and tool are relatively oriented so that the contoured active conducting portions on the tool are opposite the regions of the workpiece which are to be deburred. This can be done by providing suitable indexing means for either or both of the workpiece and the tool. Thus a screw or pin may be provided supported by the base which locates with a particular part of the workpiece. The assembly is contained within an enclosure 23 which fits closely around the assembly and which is sealed by means of an O ring 24 to the base 19. Electrolyte is caused to flow from the pipe 25 through the bore 26 in the tool 21 into the enclosure, through the working gap 22 between the tool and the workpiece, and out of the housing by pipe 27 connected to the enclosure. In this way the electrolyte is confined within the enclosure and no spillage of electrolyte occurs, or vapour or spray is allowed to escape during the electrochemical machining operation. It will be understood that the workpiece 18 and tool 21 are connected in an electric circuit so that the workpiece forms an anode and the tool a cathode during the electrochemical machining operation. A pressure valve 28 may be connected in the outlet pipe 27 so as to retain a desired pressure within the enclosure. After the deburring operation has taken place, the supply of electrolyte is cut off by closing the valve 29 in the pipe 25 and the electrolyte is drained from the housing. In order to facilitate the removal of electrolyte, compressed air can now be admitted to the enclosure through the connection 30 in order to blow out any remaining electrolyte from the enclosure and at least partially dry the workpiece.

Whilst particular embodiments have been described, it will be understood that various modifications may be made without departing from the scope of the invention.

We claim:
1. Apparatus for removing burrs from a metal workpiece having a linear edge from which burrs are to be removed, said apparatus comprising a base on which the workpiece is mounted, enclosure means sealed to said base and defining an enclosure containing said workpiece, means to cause electrolyte to flow into said enclosure, and conduit means for the exhaust of electrolyte from said enclosure, said conduit means including restrictor means to retain a desired electrolyte pressure within the enclosure, tool means within said enclosure, and electrical direct current supply means connected to said metal workpiece and to said tool means so that said workpiece is positive in relation to said tool means, said tool means comprising a metal body enclosed in insulating material but having an exposed linear portion of metal in the surface of the insulating material, said exposed linear portion of the tool means being aligned with and in juxtaposed relation to the linear edge of the metal workpiece to form a working gap therebetween, said working gap being within said enclosure and having electrolyte flowing therethrough, whereby metal is only removed from said linear edge of said workpiece.

2. Apparatus for removing burrs from a metal workpiece having a linear edge from which burrs are to be removed, said apparatus comprising a base on which the workpiece is mounted, enclosure means sealed to said base and defining an enclosure containing said workpiece, means to cause electrolyte to flow into said enclosure, and conduit means for the exhaust of electrolyte from said enclosure, said conduit means including restrictor means to retain a desired electrolyte pressure within the enclosure, tool means within said enclosure, and electrical direct current supply means connected to said metal workpiece and to said tool means so that said workpiece is positive in relation to said tool means, said tool means comprising a metal sheet enclosed in insulating material but having an exposed linear edge portion of said metal sheet at the surface of the insulating material, said exposed linear edge portion of the tool means being aligned with and in juxtaposed relation to the linear edge of the metal workpiece to form a working gap therebetween, said working gap being within said enclosure and having electrolyte flowing therethrough, whereby metal is only removed from said linear edge of said workpiece.

3. Apparatus for removing burrs from a metal workpiece having a linear edge from which burrs are to be removed, said apparatus comprising a base on which the workpiece is mounted, enclosure means sealed to said base and defining an enclosure containing said workpiece, means to cause electrolyte to flow into said enclosure, and conduit means for the exhaust of electrolyte from said enclosure, said conduit means including restrictor means to retain a desired electrolyte pressure within the enclosure, tool means within said enclosure, and electrical direct current supply means connected to said metal workpiece and to said tool means so that said workpiece is positive in relation to said tool means, said tool means comprising a metal sheet sandwiched between members of insulating material and having an exposed linear edge portion of said metal sheet at the surface of the insulating material, said exposed linear edge portion of the tool means being aligned with and in juxtaposed relation to the linear edge of the metal workpiece to form a working gap therebetween, said working gap being within said enclosure and having electrolyte flowing therethrough, whereby metal is only removed from said linear edge of said workpiece.

4. Apparatus as claimed in claim 3, including a tool intended for deburring gear teeth and wherein the insulating material has teeth adapted to interfit between the gear teeth to be deburred and said metal sheet has linear edge portions exposed at the surface of the tips and sides of the teeth of the tool but which are cut back below the insulating material between the teeth whereby deburring will take place on the side of and between the gear teeth on a gear to be deburred without removing metal from the tips of the gear teeth which will lie opposite the regions of the metal sheet which are cut back from the surface of the insulating material.

5. Apparatus for removing burrs from a metal workpiece having a linear edge from which burrs are to be removed, said apparatus comprising a base on which the workpiece is mounted, enclosure means sealed to said base and defining an enclosure containing said workpiece, means to cause electrolyte to flow into said enclosure, and conduit means for the exhaust of electrolyte from said enclosure, said conduit means including restrictor means to retain a desired electrolyte pressure within the enclosure, tool means within said enclosure, and electrical direct current supply means connected to said metal workpiece and to said tool means so that said workpiece is positive in relation to said tool means, said tool means comprising a metal block embedded in insulating material and having an arm whose end forms an exposed linear portion of metal in the surface of the insulating material, said exposed linear portion of the tool means being aligned with and in juxtaposed relation to the linear edge of the metal workpiece to form a working gap therebetween, said working gap being within said enclosure and having electrolyte flowing therethrough, whereby metal is only removed from said linear edge of said workpiece.

6. Apparatus for removing burrs from a metal workpiece having a linear edge from which burrs are to be removed, said apparatus comprising a base on which the workpiece is mounted, enclosure means sealed to said base and defining an enclosure containing said workpiece, means to cause electrolyte to flow into said enclosure, and conduit means for the exhaust of electrolyte from said enclosure, said conduit means including restrictor means to retain a desired electrolyte pressure within the enclosure, tool means within said enclosure, and electrical direct current supply means connected to said metal workpiece and to said tool means so that said workpiece is positive in relation to said tool means, said tool means comprising a metal rod embedded in insulating material and having an axially extending surface forming an exposed linear portion of metal in the surface of the insulating material, said exposed linear portion of the tool means being aligned with and in juxtaposed relation to the linear edge of the metal workpiece to form a working gap therebetween, said working gap being within said enclosure and having electrolyte flowing therethrough, whereby metal is only removed from said linear edge of said workpiece.

References Cited
UNITED STATES PATENTS

| | | | |
|---|---|---|---|
| 3,268,434 | 8/1966 | Weincartner | 204—224 |
| 3,288,699 | 11/1966 | Trager et al. | 204—224 |
| 3,372,099 | 3/1968 | Clifford | 204—143 |
| 3,399,125 | 8/1968 | Mikoshiba | 204—143 |

OTHER REFERENCES

Metalworking News, May 27, 1963, p. 12.

ROBERT K. MIHALEK, Primary Examiner

U.S. Cl. X.R.

204—143, 289, 290